March 31, 1970     G. BORGHI     3,504,069
METHOD FOR MANUFACTURING THERMALLY-INSULATED CABINETS
FOR REFRIGERATORS AND THE LIKE
Filed May 16, 1966     3 Sheets-Sheet 1
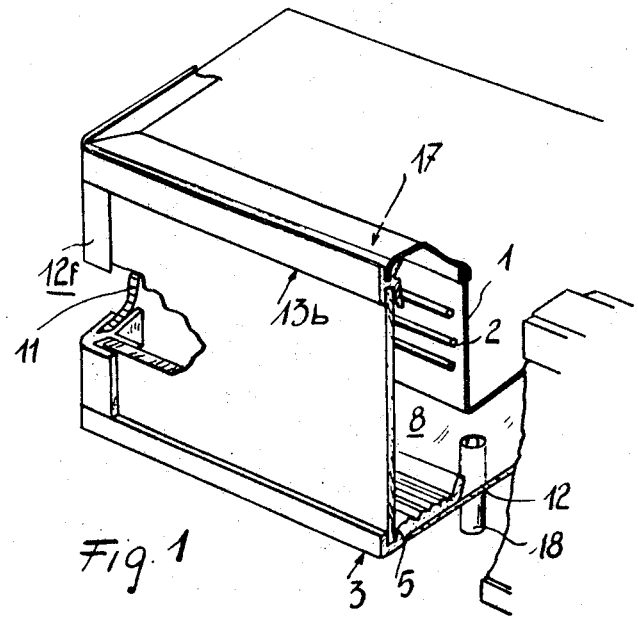
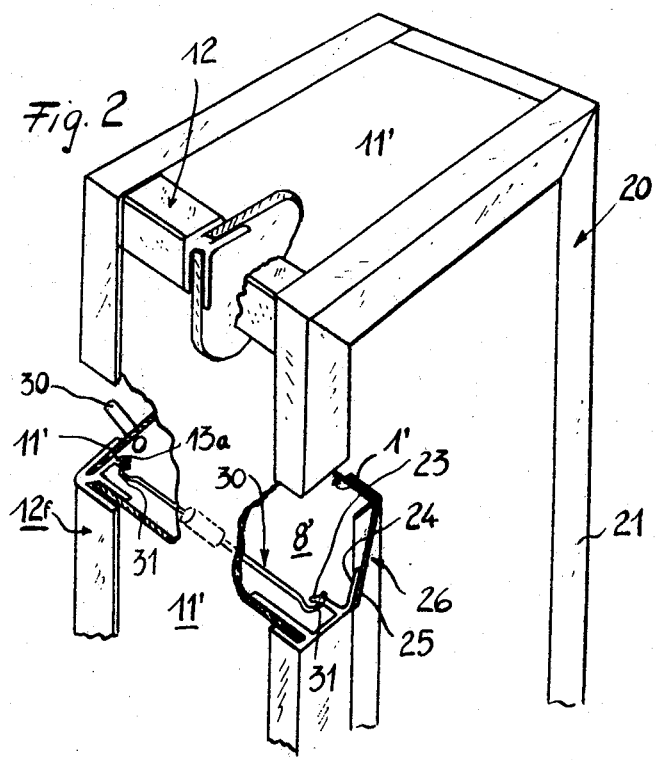
INVENTOR
GIOVANNI BORGHI
BY Steinberg & Blake
ATTORNEYS March 31, 1970  G. BORGHI  3,504,069
METHOD FOR MANUFACTURING THERMALLY-INSULATED CABINETS
FOR REFRIGERATORS AND THE LIKE
Filed May 16, 1966  3 Sheets-Sheet 2
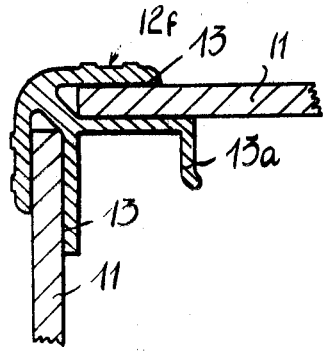
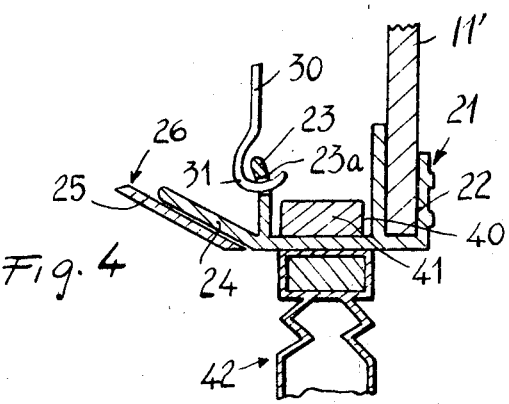
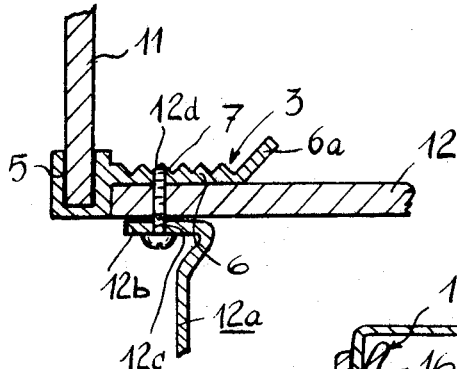
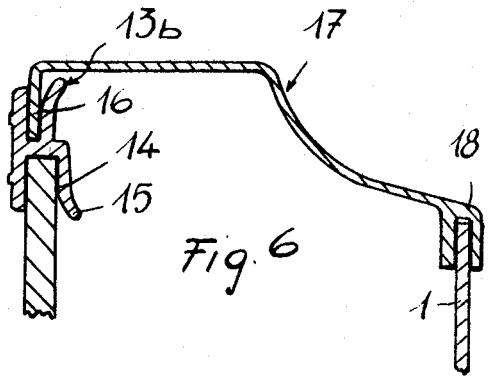
INVENTOR
GIOVANNI BORGHI
BY Steinberg & Blake
ATTORNEYS

United States Patent Office 3,504,069
Patented Mar. 31, 1970

3,504,069
METHOD FOR MANUFACTURING THERMALLY-INSULATED CABINETS FOR REFRIGERATORS AND THE LIKE
Giovanni Borghi, Comerio, Varese, Italy
Filed May 16, 1966, Ser. No. 550,384
Int. Cl. B29h 12/00
U.S. Cl. 264—45      4 Claims

ABSTRACT OF THE DISCLOSURE

A thermally-insulated cabinet particularly suitable for refrigerators, freezers, and the like, and a method for manufacturing such a cabinet. The cabinet has an external casing and an internal casing defining with the external casing a space which is filled with polyurethane foam or the like. The external casing is composed of a number of panels and a plurality of extrusions situated along edge and corner regions of the external casing and formed with grooves which initially loosely receive the edges of the panels to form therewith the external casing which initially is composed only of the loosely assembled panels and extrusions. This latter external casing together with the internal casing are placed in a suitable mold or the like where their positions with respect to each other are maintained, and then the foamable plastic, such as polyurethane, is introduced into the space between the casings to set and harden therein. This plastic filling not only acts as a thermal insulation, but in addition it acts to fixedly assemble the internal casing and the components of the external casing to each other in a substantially rigid manner preventing movement of any of the components of the casings, one with respect to the other, so that in this way the filling serves as a connecting and holding structure as well as an insulation material. Thus, the cabinet includes an outer casing composed of panels and grooved extrusion members and the like and an inner casing all held together by the insulating plastic which fills the gap between the external and internal casings.

---

The present invention relates to a process for making cabinets by injecting into a gap defined between two casings polyurethane foams, or other already known expansible resins, designed to expand within said gap so as to form upon setting completion a monolithic body with such walls.

The invention is also concerned with the cabinet thus obtained. The specific, even though not exclusive field of utilization for the inventive process is the provision of refrigerating cabinets, i.e., freezers, refrigerators, and the like.

Particularly, but not exclusively referring to the field of refrigerating cabinets, it is known that the same are being produced nowadays by using an external casing of metal plate to which the internal casing, also made of metal plate or plastics, is coupled, for example being secured by screws, said internal casing defining the space wherein the foodstuffs are placed. Into the gap between the internal and external casings there is injected, according to procedures known for instance by other patents in the same applicant's name, a polyurethane foam which, on expanding within said cavity, will thoroughly occupy it, forming with the setting thereof the thermal insulation for the refrigerating cabinet. The internal and external casings of the refrigerating cabinet are suitably disposed within a die or mould having movable walls and the purpose of which is to prevent such casings from being buckled under the action of stresses produced during the injection and expanded formation steps. Such a die or mould is known for instance by a further patent in the same applicant's name.

On the outside, the internal and external casings for a cabinet of such a character are made of stamped and fire-painted metal plate, and on the inside are made of stamped and fire-enamelled metal plate; which considerably increase the production cost. There are, in fact, heavy ammortization costs relative to stamping presses and welding machines, a high cost of skilled labour for welding operations, as well as high expenses for machinery, material and labour for fire-painting and enamelling operations.

It is the main object of the present invention to provide a process allowing a significant reduction in production costs of cabinets, particularly for a usage in the refrigerant industry art, by additionally simplifying the execution thereof, which may be accomplished by extraordinary simple machinery and without any expensive equipment also in small firms, the need for stamping metal parts and for carrying out large welding, painting and/or enamelling operations being eliminated.

To this purpose, the invention suggests a process consisting in providing an external casing from sections, preferably of extruded aluminium, provided with guides and panels slipped into said guides and surrounded by said sections, the elements for said external casing thus being weakly joined, whereas the internal casing, which may be carried out in the same or in the usual manner, is so disposed with respect to the former that a gap will result, into which the polyurethane foam is injected, which foam, upon solidification, will block the hole forming a monolithic cabinet, and which cavity will constitute at the same time an effective thermal insulation and even an acoustical one. Substantially, the concept of the invention is to utilize the polyurethane foam not only as an insulating material, but also as a binder for the various combined elements of the cabinet.

According to the invention, the panels being used are of plastic laminates, such as the type known under the commercial name "Formica" and widely used in the furniture manufacturing field, whilst the sections, operating as guide and guard means for the various panels and disposed so as to characterize the external casing, are usefully provided in extruded aluminium.

The invention will be better understood from the following detailed description, given by way of mere example and thus of not limitation, of some embodiments thereof, illustrated in the appended drawings, in which:

FIG. 1 is a diagrammatic perspective view of the detail relative to a cabinet for freezers or refrigerators;

FIG. 2 shows a refrigerating cabinet, and FIGS. 3, 4, 5 and 6 show various cross-sections of the section elements utilized in the manufacturing of the cabinets related to in the preceding figures;

Figure 7:
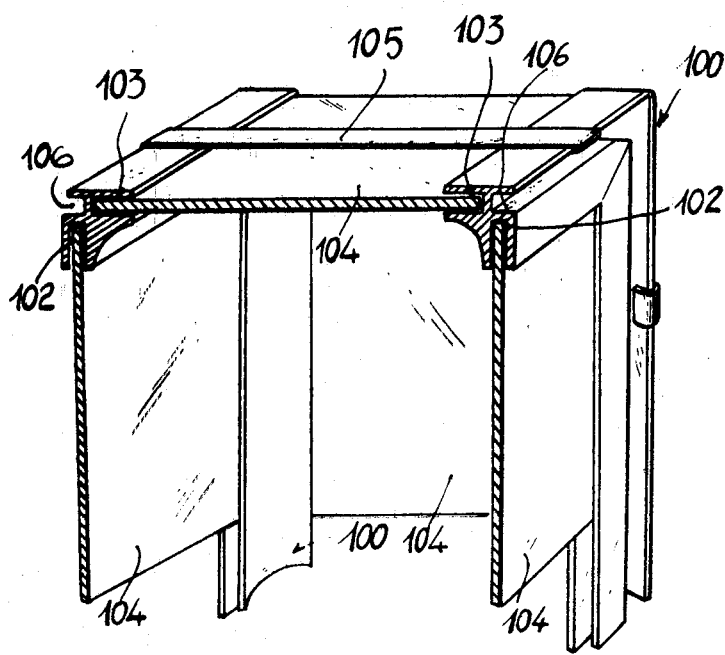
FIG. 7 is a partially sectional, perspective view of a portion of the inner box element (cell) according to a modified embodiment.

Referring to FIG. 1, the internal casing for the cabinet of the deep-frozen food container is shown at 1. Such a basin-shaped internal casing may be provided by conventional procedures and materials. As diagrammatically shown, coil 2, forming the evaporator for the refrigerating circuit, is applied, such as by conventional fastening means, against said internal casing on the outside thereof.

The external casing comprises panels of plastic laminate and different type aluminium sections, of which the one indicated has the shape visible in FIG. 5 and includes a guide groove 5 and laterally a flange 6 bent at 6a and having a toothed inner face 7. The end 6a of said flange forms an embedding extension within the polyurethane foam which, according to the invention, is injected into the gap 8 between the internal and external casings.

A frame is provided from said section 3 by removing, such as by a saw, a right triangle length of flange 6 at what will be the corner, and hence the section is bent at such removed lengths so as to obtain the right angle corner. The two free ends of said section may be welded to each other or merely drawn near. The bottom end of the plastic laminate panel or panels 11 are slipped into said groove 5, said panels 11 forming the front, rear and side walls for the cabinet, whereas beneath flange 6 a further plastic laminate (or other material) panel 12 bears, this panel forming the bottom portion for the cabinet.

As seen from FIG. 5, to the bottom panel and flange 6 there is fixed the base structure or baseboard 12a of the freezer, wherein the engine-compressor unit and the condenser (not shown) are incorporated. To the purpose, the base structure 12a may have an upper rim flange 12b provided with holes 12c for the passage of screws, such as self-tapping screws 12d, screwing into flange 6 and joining therefore baseboard 12a to the upper portion of the cabinet the invention is concerned with.

Moreover, the sections 12f shown in FIG. 3 are utilized at the corners, said sections having two grooves at 90°, indicated at 13, into which panels 11 converging to said corner are merely slipped, as well as with the lower end thereof into the frame formed of sections 3. Uprights 12f merely bear onto frame 3, that is they rest thereon and are not fixed thereto. Occasionally, for a purpose to be specified hereinafter, section 12f may have a bored bent lug 13a.

On the top, there is provided a second rectangular frame formed of the section having the cross-section shown in FIG. 6 and indicated at 13b. The frame is made in a manner similar to that for the bottom frame formed of section 3.

In the lower part, section 13b has a groove 14 into which the upper end of panels 11 slip. At 15 one of the sides of said groove is slightly inwardly bent so as to form an embedding extension in the mass of polyurethane foam. Moreover, section 13b has a narrower groove 16 to accommodate the section element 17, made for example of plastic material, the function of which is to close cavity 8 on the top and to form the upper side of the cabinet obtained due to the application of the cover (not shown). At one end, section 17 has a fork guide 18 into which the upper contour or edge of the internal casing 1 is slipped. Section 17 may be obtained by extrusion and welded to other sections so as to form the upper side of the cabinet, or, alternatively, may be obtained by stamping and forming a rectangular frame.

Figure 8:
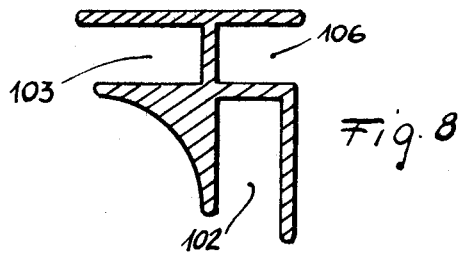
FIG. 8 is a cross-section of the section element being used in manufacturing the beads or profiling elements for the frames shown in FIG. 7.

Referring to FIG. 7, a metal section, the cross-section of which is shown in FIG. 8, is used to form two identical beads or profiles 100, and in conformity with the distance between the two beads or profiles 100 the brackets 105 are arranged, said brackets being formed of lengths of sheet band having U-bent ends, replaceable, however, by any other means capable of attaining the same result.

The metal section, the two beads or profiles 100 are made of, is of a cross-section (FIG. 8) having three grooves, two grooves 103 and 106 on a same plane, the third groove 102 being on a plane normal to the plane of the other two grooves.

The drying of the above box element (cell) is achieved by interposition of panels 104 between the two beads or profiles 100, said panels being slipped into grooves 102 and 103 to hold the assembly and to resist the outer strains resulting from the injection of the synthetic material; the two beads or profiles, having the panels slipped into the grooves of the sections, are connected to each other by the brackets 105 having hook-shaped ends, said brackets being in such number to allow stiffening of the assembly.

Once the panels 104, or a plate in lieu of them, have been mounted, the framework forms a single block as the beads or profiles 100 are held on the panels by brackets 105.

Brackets 105 are provided in such number to prevent deformation of the assembly when the plastic material is injected between the internal casing (cell) according to the present variant and the external casing, besides aiding, of course, in the assembling and handling of the parts.

According to a further embodiment modification of the subject process, the sections forming the beads or profiles, instead of having a complete groove for accommodating the brackets, as groove 106 of FIG. 8, may have an offset lug on the section which will suffice for hooking the same to the bracket.

The so-composed cabinet is placed into a die, of a type such as that described in another patent in the same applicant's name, so as to be inverted, that is, so that surface 12 will face upward and section 17, or the frame formed by said section, will face downward. Against the various faces of the cabinet, which is formed of elements still weakly combined to one another, the plates of the die are applied, and through a nipple 18 emerging and mounted in wall 12 there is injected into cavity 8 the polyurethane foam, which will expand within said cavity and, on setting, will block movement all the elements with respect to one another producing a monolithic body or cabinet.

The cabinet so obtained does not require any external finishing, since panels 11, being made of plastic laminate, have a finished appearance not requesting any further paintings or finishing operations.

The cabinet so obtained is composed of flat panels, guide sections acting also as guards and framings, an internal casing and a filling of expanded polyurethane foam, which forms the material blocking movement of the various elements with respect to one another and forming the insulation.

In FIG. 2 a refrigerating cabinet is diagrammatically shown, said cabinet being produced according to the same concept for the cabinet of FIG. 1. The cell or internal casing, herein indicated at 1', may be obtained by stamping and made, for example, of fire-enamelled stamped plate or also of plastic material. The external casing comprises panels 11' of plastic laminate, guided and extending into grooves of extruded aluminium sections characterized by the same reference numerals used for the corresponding sections of the embodiment of FIG. 1 where the sections are identical. The only difference is that frontally, that is on the side of the door of the refrigerating cabinet, there is provided a rectangular frame 20 formed of a section such as that shown at 21 and illustrated in the transverse cross-section of FIG. 4. This section has a guide groove 22 wherein the edges of panels 11' are placed and also a curved extension 23, having holes 23a and being designed to remain embedded within the expanded polyurethane, as well as an inclined lug 24, onto which the end 25 of a section element, for example of plastic material and the cross-section of which can be seen in FIG. 2, is designed to rest, said section element acting as a connection between frame 20 and inner cell 1' and closes gap 8'. Said section element 26 may, as that indicated at 17 in the embodiment of FIG. 1, form part of a rectangular frame obtained by stamping.

In the case of the refrigerating cabinet of FIG. 2, the front section 21 is generally made of aluminium, hence of non-ferromagnetic material, so that, in order that it be possible to use the magnetic gasket the refrigerator door is usually provided with, within the space 40 of section 21 there is, surrounding the aperture of the cabinet, a ferromagnetic or magnetized metal section 41, designed to cooperate with the magnetic gasket or seal 42 of the door.

As illustrated at FIGS. 2, 3 and 4, there may be provided turnbuckles or tie rods 30, with a hook termination in 31 and anchored by means of the latter through bored extensions (as indicated at 23 in FIG. 4 and at 13a in FIGS. 2 and 3) on the section elements. The purpose of these tie rods is to prevent section elements from being partially slipped off the panels upon subsequent expansions and contractions (of a thermal nature). Tie rods will be embedded within the expanded material. In addition, said tie rods might have the purpose of keeping the elements together at the assembly step, that is prior to placing the whole into the mould for being injected.

After having placed the weakly joined structure into a die or mould through the connection 30, in the rear wall 11′, the polyurethane foam is injected into the cavity 8′ between the external and internal casings, said polyurethane foam blocking, upon expansion and setting, the various elements against movement one with respect to the other and producing a monolithic body.

It is within the scope of the invention a solution in which one or more contiguous elements of the cabinet are obtained from a single flat panel of (hot) curved plastic laminate at that or those portions that will be the corners of the cabinet. Of course, at these corners the metal sections would be eliminated.

It is apparent that within the scope of the invention are included other cabinets of a completely different shape from those herein shown and described which have the only illustrative and explanatory purpose of the informing concepts of the invention.

I claim:

1. In a method for manufacturing thermally-insulated cabinets suitable particularly for refrigerators and freezers the steps of initially forming an external casing from a plurality of panels and elongated guide sections formed with grooves by carrying out steps which include slipping edges of the panels into said grooves so that said panels and guide sections only engage each other but are not fixed to each other, loosely and temporarily interconnecting an internal casing and said external casing with the internal and external casings defining a cavity between themselves, and then injecting into said cavity a polyurethane expansible foam which will solidify and set to provide thermal insulation as well as to block movement of the casings and in particular the panels and sections of the external casing with respect to each other to achieve a unitary substantially rigid structure, the parts of which are held together, immovably with respect to each other, by the injected foam.

2. In a method as recited in claim 1 and wherein said elongated guide sections are in the form of extrusions, the step of situating said extrusions along edge and corner regions of said external casing.

3. In a method as recited in claim 1, the step of connecting brackets with opposed sections of said external casing in the space which subsequently is filled with the polyurethane foam plastic.

4. In a method as recited in claim 2 and wherein said panels are flat and have various external finishes, the step of selecting panels with given exterior finishes thereon to be situated in the grooves of the extrusions so that the exterior of the cabinet will have a selected appearance.

References Cited

UNITED STATES PATENTS

| | | | |
|---|---|---|---|
| 2,392,734 | 1/1946 | Haberstump | 161—149 |
| 2,869,336 | 1/1959 | Smidl. | |
| 2,978,136 | 4/1961 | Ehrenfreund. | |
| 3,221,085 | 11/1965 | Rill et al. | 264—45 |
| 3,373,478 | 3/1968 | Simmonds. | |

JULIUS FROME, Primary Examiner

L. GARRETT, Assistant Examiner

U.S. Cl. X.R.

156—79; 161—161; 264—54